United States Patent [19]
Saegusa

[11] Patent Number: 6,038,681
[45] Date of Patent: Mar. 14, 2000

[54] MULTI-ARRAY DISK APPARATUS

[75] Inventor: Takuya Saegusa, Tokyo, Japan

[73] Assignee: NEC Corporation, Tokyo, Japan

[21] Appl. No.: 08/922,750

[22] Filed: Sep. 3, 1997

[30] Foreign Application Priority Data

Sep. 4, 1996 [JP] Japan ................................. 8-234375

[51] Int. Cl.[7] .................................................. G06F 11/00
[52] U.S. Cl. .................................. 714/6; 714/30; 714/42; 714/47
[58] Field of Search ................... 395/182.04, 182.03, 395/182.05; 714/6, 5, 3, 25, 30, 42, 47

[56] References Cited

U.S. PATENT DOCUMENTS

| | | | |
|---|---|---|---|
| 5,097,437 | 3/1992 | Patriquin et al. | 395/425 |
| 5,155,845 | 10/1992 | Beal et al. | 395/575 |
| 5,367,669 | 11/1994 | Holland et al. | 395/575 |
| 5,455,934 | 10/1995 | Holland et al. | 395/404 |
| 5,459,857 | 10/1995 | Ludlam et al. | 395/182.04 |
| 5,504,882 | 4/1996 | Chai et al. | 395/182.03 |
| 5,568,629 | 10/1996 | Gentry et al. | 395/441 |
| 5,617,425 | 4/1997 | Anderson | 371/10.2 |
| 5,737,510 | 4/1998 | Kakuta et al. | 395/182.04 |
| 5,768,623 | 6/1998 | Judd et al. | 395/857 |
| 5,771,367 | 6/1998 | Beardsley et al. | 395/489 |
| 5,809,285 | 9/1998 | Hilland | 395/520 |
| 5,822,782 | 10/1998 | Humlicek et al. | 711/170 |
| 5,848,230 | 12/1998 | Walker | 395/182.05 |

FOREIGN PATENT DOCUMENTS

| | | |
|---|---|---|
| 62-202256 | 9/1987 | Japan . |
| 5-165772 | 7/1993 | Japan . |
| 6-139028 | 5/1994 | Japan . |
| 7-262033 | 10/1995 | Japan . |
| 8-221289 | 8/1996 | Japan . |

OTHER PUBLICATIONS

A. Bhide et al., "A Highly Available Network File Server", 1991, Usenix, pp. 199–205.

*Primary Examiner*—Norman Michael Wright
*Attorney, Agent, or Firm*—Sughrue, Mion, Zinn, Macpeak & Seas, PLLC

[57] ABSTRACT

A multi-array disk apparatus includes first and second logical drives, a first array controller, a second array controller, and interface control circuits. Each of the first and second logical drives has two logical structure disks constituting a pair. The first array controller controls the first logical drive. The second array controller controls the second logical drive. When a fault occurs in the other of the first and second array controllers, the interface control circuits bus-connect one of the first and second array controller in which no fault occurs to the logical structure disk connected to the other of the first and second array controller in which the fault occurs.

5 Claims, 5 Drawing Sheets

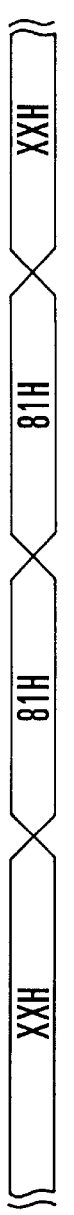
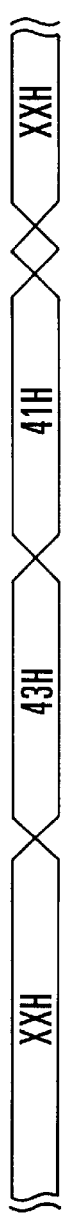

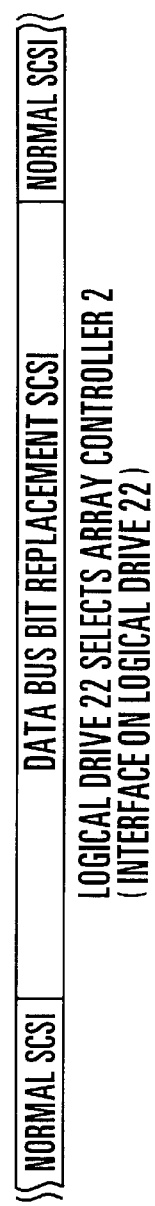
FIG. 5A
FIG. 5B
FIG. 5C
FIG. 6A
FIG. 6B
FIG. 6C

MULTI-ARRAY DISK APPARATUS

BACKGROUND OF THE INVENTION

The present invention relates to a multi-array disk apparatus and, more particularly, to a multi-array disk apparatus having a double array controller arrangement.

Conventionally, in an array disk apparatus having one array controller, and a logical drive constituted by a double logical structure disk arrangement, even if one logical structure disk breaks down due to a fault, the other logical structure disk is operable. The faulty disk is replaced with a new one and then recovered, so the system is not influenced. If, however, a fault occurs in the array controller, the logical drive cannot be used.

In the prior art, therefore, array controllers 52 and 53 constitute a double array controller arrangement, as shown in FIG. 7. Even if a fault occurs in the array controller 52, the array controller 53 can control a logical drive 71 constituted by logical structure disks 57 and 58. In FIG. 7, the array controllers 52 and 53 respectively comprises host interfaces 61 and 65 for host devices 69 and 70, array control circuits 62 and 66, and I_SPCs (Initiator SCSI Protocol Controllers) 63, 64, 67, and 68. This technique is disclosed in Japanese Patent Laid-Open Nos. 5-165772 and 7-262033.

The conventional multi-array disk apparatus employs the plurality of array controllers 52 and 53 arranged for one logical drive 71 due to the double array controller arrangement, resulting in poor efficiency. Since the logical structure disks 57 and 58 have the same ID (IDentifier) in consideration of an artificial miss or maintenance, the two logical structure disks cannot be mounted on the same interface. Further, the control device IDs of the array controllers 52 and 53 for the logical drive 71 must be different from each other.

In the conventional multi-array disk apparatus, one of the array controllers 52 and 53 is normally unused, and no other logical drive is assigned under the array controller. For this reason, the multi-array disk apparatus has a normally unused array controller for one logical drive, resulting in poor efficiency.

Further, devices having the same ID cannot exist on a SCSI (Small Computer System Interface). When a fault is to be recovered by an array controller having another logical drive, the ID of the logical drive must be different from that of the array controller and that under the array controller, and must be changed by an artificial operation to complicate maintenance.

SUMMARY OF THE INVENTION

It is an object of the present invention to provide a multi-array disk apparatus wherein poor efficiency caused by a double array controller arrangement can be improved by only a fault countermeasure, and reliability can be ensured against the fault of the array controller.

It is another object of the present invention to provide a multi-array disk apparatus in which, even if the logical drive control device IDs of two array controllers or the logical structure disk IDs under the array controller are the same, they can exist on a SCSI.

In order to achieve the above objects, according to the present invention, there is a multi-array disk apparatus comprising first and second logical drive means each having two logical structure disks constituting a pair, first array control means for controlling the first logical drive means, second array control means for controlling the second logical drive means, and interface control means for, when a fault occurs in the other of the first and second array control means, bus-connecting one of the first and second array control means in which no fault occurs to the logical structure disk connected to the other of the first and second array control means in which the fault occurs.

BRIEF DESCRIPTION OF THE DRAWINGS

FIGS. 3A to 3C are timing charts, respectively, showing processing of selecting the corresponding first logical drive by the first array controller;

FIGS. 4A to 4C are timing charts, respectively, showing processing of selecting the second logical drive corresponding to the second array controller by the first array controller;

FIGS. 5A to 5C are timing charts, respectively, showing processing of reselecting the corresponding first array controller by the first logical drive;

FIGS. 6A to 6C are timing charts, respectively, showing processing of reselecting the first array controller corresponding to the first logical drive by the second logical drive.

DESCRIPTION OF THE PREFERRED EMBODIMENT

The present invention will be described in detail below with reference to the accompanying drawings.

Figure 1:
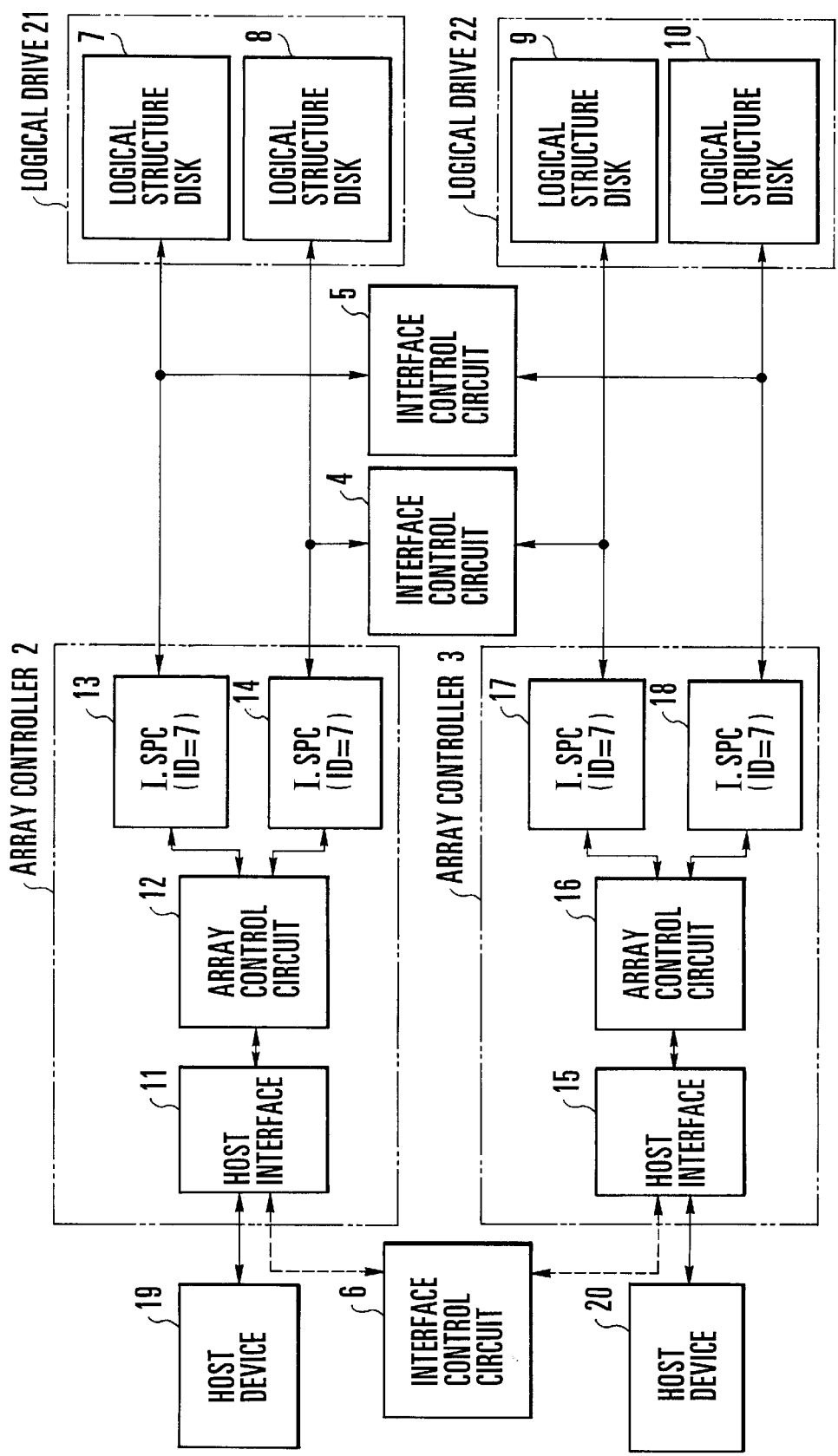
FIG. 1 is a block diagram showing the arrangement of a multimedia disk apparatus according to an embodiment of the present invention.

FIG. 1 shows the arrangement of a multi-array disk apparatus according to an embodiment of the present invention. The multi-array disk apparatus comprises a logical drive 21 having a pair of logical structure disks 7 and 8, a logical drive 22 having a pair of logical structure disks 9 and 10, and array controllers 2 and 3 constituting a double array controller arrangement to independently control the logical drives 21 and 22.

The multi-array disk apparatus comprises interface controllers 4 and 5 for, when a fault occurs in the array controller 3, bus-connecting the array controller 2 to the pair of logical structure disks 9 and 10 connected to the array controller 3 in which the fault occurs. Similarly, when a fault occurs in the array controller 2, the interface controllers 4 and 5 bus-connect the array controller 3 to the pair of logical structure disks 7 and 8 connected to the array controller 2 in which the fault occurs.

In normal use wherein no fault occurs, the array controllers 2 and 3 can be separately controlled for the logical drives 21 and 22. Even if a fault occurs in one of the array controllers 2 and 3, the interface control circuits 4 and 5 connect the other of the array controllers 2 and 3 in which no fault occurs to the logical drive of one of the array controllers 2 and 3 in which the fault occurs. Accordingly, the other of the array controllers 2 and 3 in which no fault occurs can access the faulty logical drive.

The interface control circuits 4 and 5 have a disconnection function of bidirectionally disconnecting the bus connection between the array controllers 2 and 3 by the interface control circuits 4 and 5 when no fault occurs in both the array controllers 2 and 3.

The multi-array disk apparatus shown in FIG. 1 will be described in detail below with reference to FIG. 2. Host devices 19 and 20 are respectively connected to host interfaces 11 and 15 of the array controllers 2 and 3. In this embodiment, this connection interface is a SCSI. A multi-array disk apparatus 1 comprises the array controllers 2 and 3 constituting a double array controller arrangement, and the two logical drives 21 and 22 controlled by the array controllers 2 and 3.

The logical structure disk 7 connected to the array controller 2 is connected through the interface control circuit 5 to the logical structure disk 10 connected to the array controller 3. Similarly, the logical structure disk 8 is connected to the logical structure disk 9 through the interface control circuit 4.

The array controller 2 comprises, for the respective logical structure disks 7 and 8, I_SPCs 13 and 14 serving as control devices for connecting the logical structure disks 7 and 8 to the interface control circuits 5 and 4. The array controller 3 comprises, for the respective logical structure disks 9 and 10, I_SPCs 17 and 18 serving as control devices for connecting the logical structure disks 9 and 10 to the interface control circuits 4 and 5. All the SCSI IDs of the I_SPCs 13, 14, 17, and 18 are "7", whereas all the IDs of the logical structure disks 7, 8, 9, and 10 are "0". Reference numeral 6 denotes an interface control circuit (to be described later) for bus-connecting the host interfaces 11 and 15.

Figure 2:
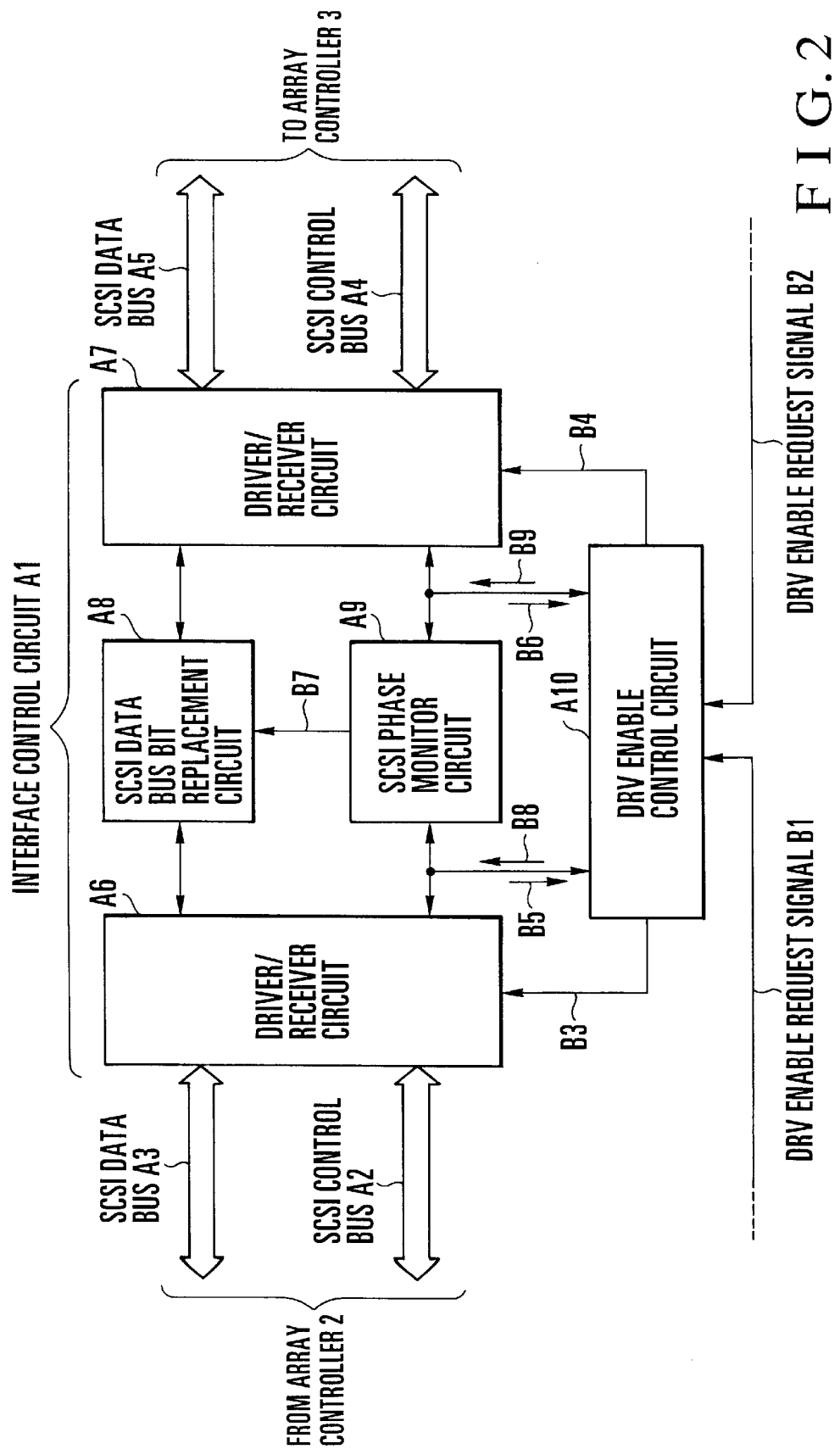
FIG. 2 is a block diagram showing the detailed arrangement of an interface control circuit shown in FIG. 1.
Figure 7:
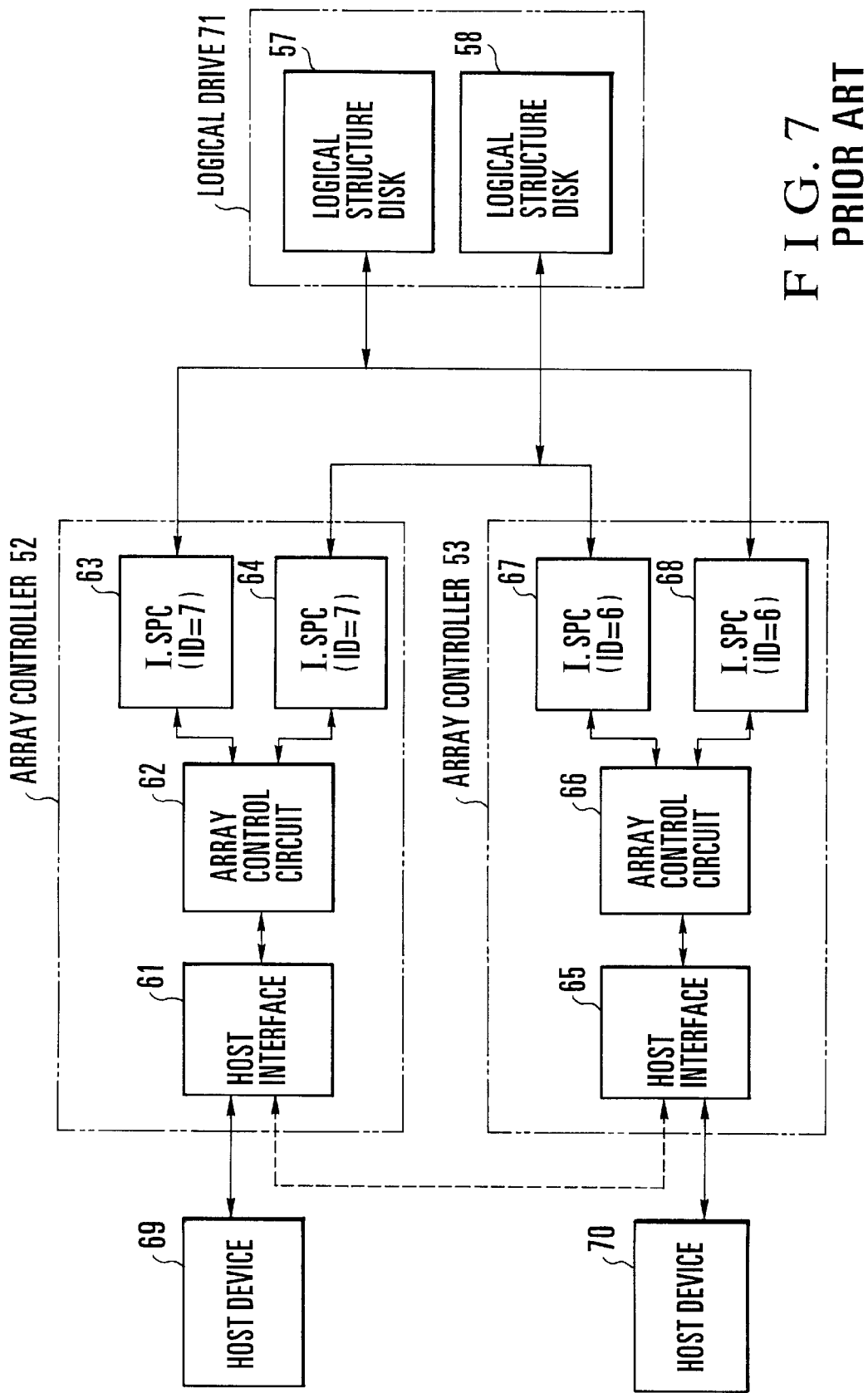
FIG. 7 is a block diagram showing the arrangement of a conventional array disk apparatus.

FIG. 2 shows the detailed arrangement of the interface control circuits 4, 5, and 6. Each of the interface control circuits 4, 5, and 6 comprises a bit replacement circuit A8 for, when a fault occurs in one of the array controllers 2 and 3, and the other array controller in which no fault occurs is connected to the logical drive of the array controller in which the fault occurs, replacing a bit representing the ID of the array controller in which the fault occurs, and a bit representing the ID of the logical drive connected to the array controller in which the fault occurs with predetermined bits. When the host device 19 accesses the predetermined bit (ID), the array controller 2 controls the logical drive 22 in addition to the logical drive 21.

More specifically, as shown in FIG. 2, an interface control circuit A1 corresponding to each of the interface control circuits 4, 5, and 6 comprises driver/receiver circuits A6 and A7 respectively connected to the array controllers 2 and 3 through SCSI data buses A3 and A5 and SCSI control buses A2 and A4, the SCSI data bit replacement circuit A8 connected to a data signal path between the driver/receiver circuits A6 and A7 to replace bits, a SCSI phase monitor circuit A9 connected to a control signal path between the driver/receiver circuits A6 and A7 to monitor the SCSI phase, and a DRV ENABLE (drive enable) control circuit A10 for controlling the driver/receiver circuits A6 and A7.

The SCSI data buses A3 and A5, and the SCSI control buses A2 and A4 are normally in a disconnection state. When the data buses A3 and A5, and the control buses A2 and A4 are in the disconnection state, the array controllers 2 and 3 independently control their SCSIs.

DRV ENABLE request signals B1 and B2 are signals selectively output from array control circuits 12 and 16. Upon reception of the DRV ENABLE request signals B1 and B2, the DRV ENABLE control circuit A10 connects the SCSI control buses A2 and A4 to each other.

The array controller 2 or 3 which has received the DRV ENABLE request serves as an initiator side. The DRV ENABLE control circuit A10 controls the bus direction between the SCSI data buses A3 and A5 in accordance with a logic combination of I/O signals B8 and B9 and the DRV ENABLE signals B3 and B4. That is, when the DRV ENABLE request signal B1 is input, the signals B8 and B9 become "active", the signal B3 becomes "active", and the signal B4 becomes "inactive" to connect the SCSI data bus A5 to the SCSI data bus A3. To the contrary, when the DRV ENABLE request signal B2 is input, the signals B8 and B9 similarly become "active", the signal B3 becomes "inactive", and the signal B4 becomes "active" to connect the SCSI data bus A3 to the SCSI data bus A5.

When a request is sent from the DRV ENABLE request signals B1 and B2, or RST signals B5 and B6 are sent, the DRV ENABLE signals B3 and B4 are reset.

The SCSI phase monitor circuit A9 monitors the SCSI phases of the SCSI control buses A2 and A4 which are connected when the DRV ENABLE request signal B1 or B2 is "active". When the SCSI phase is a bus free/arbitration/selection/reselection phase, the SCSI phase monitor circuit A9 sends a replacement request signal B7 to the SCSI data bus replacement circuit A8.

The SCSI data bus replacement circuit A8 replaces the bits of the SCSI data buses in response to the replacement request signal B7, and replaces bits to connect the SCSI data buses A3 and A5. In this case, bit 6 replaces bit 7, and bit 0 replaces bit 1. In another phase, the SCSI phase monitor circuit A9 does not send any replacement request signal B7 to the SCSI data bus replacement circuit A8. At this time, the SCSI data bus bit replacement circuit A8 does not replace bits, and the identical bits, from bit 7 to bit 0, of the SCSI data buses A3 and A5 are connected to each other.

The operation of the multi-array disk apparatus 1 will be described below with reference to the timing charts of the interface control circuit A1 shown in FIGS. 3A to 3C, 4A to 4C, 5A to 5C, and 6A to 6C. Assume that interfaces for the host devices 19 and 20 are also connected through SCSIs, and the IDs of the host interfaces 11 and 15 are "0".

First, when the host device 19 is to select the logical drive 21, the host device 19 executes arbitration, and then enables an ATN (attention) signal in executing selection. The array controller 2 which has recognized the ATN signal from the host device 19 shifts the phase to a message-out phase. After confirming the message-out phase, the host device 19 uses an "identify" message to inform the array controller 2 that control for LUN (Logical Unit Number)=0 is to be performed.

To control the logical drive 21, the array controller 2 selects the logical structure disks 7 and 8 having ID=0 in selection upon execution of arbitration, as shown in FIGS. 3A to 3C. At this time, no DRV ENABLE request signals B1 and B2 are sent, and the I_SPCs 13 and 18, and 14 and 17 of the array controllers 2 and 3 are in a disconnection state. Therefore, the control of the array controller 2 is not propagated to the interface on the logical drive 22 side.

When the host device 19 selects the logical drive 22 of the array controller 3 in which a fault occurs, the host device 19 executes arbitration, enables the ATN signal, executes selection, and then uses the "identify" message to inform the array controller 2 that control for LUN=1 is to be performed.

The array controller 2 sends the DRV ENABLE request signal B1 to connect the SCSI data buses A3 and A5, and the SCSI control buses A2 and A4. At this time, since the phase of the SCSI bus is a bus free phase, the SCSI data bus bit replacement circuit A8 replaces bit 7 with bit 6, and bit 1 with bit 0. Then, the SCSI data buses A3 and A5, and the SCSI control buses A2 and A4 are connected.

If the phase is not the bus free phase due to the fault of the array controller 3 in sending the DRV ENABLE request signal B1, the phase can be shifted to the same state by resetting the SCSI bus by an RST signal, and sending the DRV ENABLE request signal B1 again.

When the array controller 2 having ID=7 executes selection for ID=1, an initiator device having ID=6 seems to the interface on the logical drive 22 to select the logical drive 22 having ID=0, as shown in FIGS. 4A to 4C. At this time, the logical drive 21 is not selected because the phase seems to the interface on the logical drive 21 to be a selection phase from ID=7 to ID=1.

The logical drive 22 selected by the array controller 2 shifts to a message phase if the ATN signal is sent in selection, or to a command phase if no ATN signal is sent. The SCSI phase monitor circuit A9 which monitors this phase shift stops sending the replacement request signal B7 upon the phase shift. Since no replacement request signal B7 is sent, the SCSI data bus bit replacement circuit A8 connects bits 7, 6, 1, and 0 of the SCSI data bus A3 to bits 7, 6, 1, and 0 of the SCSI data bus AS so as to normally send a message/command.

With the above operation, the host device 19 can perform selection execution and control of the logical drive 22. When the array controller 2 selects the logical drive 21 while the SCSI buses are connected, this can be executed by selection for ID=0. At this time, the logical drive 22 is not selected because it seems to the interface on the logical drive 22 that the bit is rewritten, and this selection is selection for ID=6 and ID=1.

A reselection operation will be described below. When the logical drive 21 is to reselect the array controller 2 while the SCSI buses are not connected, reselection is executed upon execution of arbitration, as shown in FIGS. 5A to 5C. The reselected logical drive 21 sends a message in the message-in phase, and then is controlled by the array controller 2.

In reselecting the array controller 2 by the logical drive 22, the SCSI data bus bit replacement circuit A8 operates because the SCSI buses have already been connected by the DRV ENABLE signals B3 and B4, and the phase shifts to a bus free phase. That is, the SCSI data bus bits are being replaced.

Since the logical drive 22 recognizes the ID of the array controller 2 as ID=6, it tries to reselect ID=6 in arbitration. By the bit replacement circuit A8, the array controller 2 recognizes reselection for ID=7 and ID=1, and is reselected.

As shown in FIGS. 6A to 6C, the logical drive 22 which executes reselection shifts to the message-in phase. The SCSI phase monitor circuit A9 detects this phase shift to stop sending the replacement request signal B7. Accordingly, the bits of the SCSI data buses A3 and A5 are normally connected to each other. At this time, the logical drive 21 is not influenced because the interface on the logical drive 21 recognizes this reselection as reselection for ID=7 and ID=1.

As described above, according to this embodiment, the array controller 2 can control the logical drive 22. Similarly, the array controller 3 can also control the logical drive 21. Even if the I_SPCs 13, 18, 14, and 17 having the same ID, and the logical drives 21 and 22 having the same ID exist, the SCSIs can be controlled by the interface control circuits 4 and 5.

The host interfaces 11 and 15 are connected through the interface control circuit 6, as indicated by dotted lines in FIG. 1. Even if the SCSI-IDs of the host interfaces 11 and 15 are the same, the host device 19 can control the array controller 3 through the interface control circuit 6 by controlling the DRV ENABLE request signals B1 and B2 of the interface control circuit 6 by the host devices 19 and 20.

When the host interface is not the SCSI, even if a fault occurs in one of the array controllers 2 and 3, the other array controller can control the logical drives 21 and 22 on the basis of only a control convention from the host devices 19 and 20. The above description is related to the case wherein the number of logical structure disks of the logical drives 21 and 22 is two. However, the same control is possible even with a larger number of logical structure disks by using them through the interface control circuits.

In this manner, even if a fault occurs in the array controller, the logical drive controlled by the array controller in which the fault occurs can be controlled by an array controller controlling another logical drive. Since the array controllers are not used as a double array controller arrangement for only one logical drive, the efficiency can be improved to reduce the cost.

Since the SCSI buses between the array controllers are connected through the interface control circuit, and the bits of the SCSI data buses are replaced until completion of selection/reselection, the devices having the same ID can exist on the SCSI buses on the two sides of the interface control circuit. Since one of the devices during selection can be controlled by another ID, the devices having the same ID can exist on the SCSI interfaces.

This embodiment has exemplified the case wherein the logical structure disks 8 and 9 and the interface control circuit 4, and the logical structure disks 7 and 10 and the interface control circuit 5 are commonly connected via the bus. However, the present invention may be applied to, e.g., the case wherein the logical structure disk and the interface control circuit are daisy-chain-connected through a corresponding I_SPC. In this case, the logical structure disk 9 can access the logical drive 22 as far as the fault of the array controller 3 does not influence the interface sides of, e.g., the I_SPCs 17 and 18.

The present invention has the above-described arrangement and function. According to the present invention, the first and second array controllers independently control the first and second logical drives. In normal use wherein no fault occurs, one array controller can control one logical drive. When a fault occurs in one of the array controllers, since the interface controller connects the other array controller to the logical drive of one array controller, the other array controller can access the logical drive of one array controller in which the fault occurs. In this manner, a multi-array disk apparatus wherein poor efficiency caused by the use of the double array controller arrangement can be improved by only a fault countermeasure by connecting the logical-drive-side interfaces of the two array controllers having the logical disks thereunder, and reliability can be ensured against the fault of the array controller can be provided.

What is claimed is:

1. A multi-array disk apparatus comprising:
array controllers and logical drives, each of said logical drives corresponding to one of said array controllers;
said logical drives comprising a first logical drive and a second logical drive;
said array controllers comprising a first array controller and a second array controller;
each of said logical drives comprising a respective logical disks, including a respective first logical disk and a respective second logical disk;
for each said logical disk of one of said logical drives, a corresponding protocol controller in said corresponding one of said array controllers, said corresponding protocol controller being connected to said logical disk by a respective bus;

all of said protocol controllers having an identical first ID;

all of said logical disks having an identical second ID;

a first interface unit connected between said respective bus of said second logical disk of said first logical drive and said respective bus of said first logical disk of said second logical drive;

a second interface unit connected between said respective bus of said first logical disk of said first logical drive and said respective bus of said second logical disk of said second logical drive;

said first and said second interface units being connected to said first and said second array controllers;

said first array controller, in response to a fault detection relating to said second array controller, activating said first and said second interface units; and said first and said second interface units, when activated by said first array controller:
connecting together said respective buses,
monitoring messages on said buses, and
changing message ID information for selected ones of said messages relating to said logical disks of said second logical drive.

2. An apparatus according to claim 1, wherein, in the absence of said fault detection relating to said second array controller, said interface units do not connect together said respective buses.

3. An apparatus according to claim 1, wherein said interface control units comprise means for changing said ID information to a predetermined different ID information.

4. An apparatus according to claim 3, wherein said ID information is constituted by bit data, and said ID changing means comprises bit replacement means for replacing a bit representing the ID of said second array controller, and a bit representing the ID of said logical disks of said second logical drive with bits representing said predetermined different ID information.

5. An apparatus according to claim 3, wherein said interface control units each comprise:

first and second driver/receiver units connected to said first and second array control units through a SCSI data bus and a SCSI control bus, and being connected to said ID replacement means;

a SCSI phase monitor unit, connected to a control signal path between said first and second driver/receiver units, for activating said ID changing means on the basis of a monitor result of a SCSI phase; and a control means for enabling control said first and second driver/receiver means and for controlling a bus connection direction in response to a drive enable request signal from said first array controller.

* * * * *

UNITED STATES PATENT AND TRADEMARK OFFICE
CERTIFICATE OF CORRECTION

PATENT NO. : 6,038,681
DATED : March 14, 2000
INVENTOR(S) : Takuya Saeusa

It is certified that error appears in the above-indentified patent and that said Letters Patent is hereby corrected as shown below:

Column 5, line 21 delete "AS", insert --A5--

Signed and Sealed this

Twentieth Day of March, 2001

Attest:

NICHOLAS P. GODICI

Attesting Officer

Acting Director of the United States Patent and Trademark Office